US007666334B2

(12) United States Patent
Colavito et al.

(10) Patent No.: US 7,666,334 B2
(45) Date of Patent: Feb. 23, 2010

(54) METHOD, COMPOSITION AND APPARATUS FOR CONTROLLED CONCRETE

(75) Inventors: Dominick Michael Colavito, Bangor, PA (US); Joseph Michael Schmidt, Parker, PA (US); Michael Joseph Buscarini, Waterdown (CA); James Charles Peter Rosso, Waterdown (CA); Ronald Warren Schmidt, Macungie, PA (US); Richard Charles Griffin, Mount Bothel, PA (US); Fritz Henry, Severna Park, MD (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 768 days.

(21) Appl. No.: 11/198,445

(22) Filed: Aug. 5, 2005

(65) Prior Publication Data

US 2005/0268818 A1 Dec. 8, 2005

Related U.S. Application Data

(63) Continuation-in-part of application No. 10/007,851, filed on Oct. 31, 2001, now Pat. No. 6,926,851.

(51) Int. Cl.
 *E04B 1/16* (2006.01)
(52) U.S. Cl. .................. 264/33; 106/661; 106/802; 106/726
(58) Field of Classification Search .............. 106/726, 106/661; 264/33
See application file for complete search history.

(56) References Cited

U.S. PATENT DOCUMENTS

| 3,039,164 A | 6/1962 | Kemeny et al. |
| 3,497,579 A | 2/1970 | Barron |
| 3,878,278 A | 4/1975 | Miller et al. |
| 3,892,895 A | 7/1975 | Toogoo et al. |
| 4,171,984 A | 10/1979 | Hosaka et al. |
| 4,193,750 A | 3/1980 | Nielson |
| 4,728,670 A | 3/1988 | Haslanger et al. |
| 4,797,161 A | 1/1989 | Kirchmayr et al. |
| 5,348,583 A | 9/1994 | Arfaei et al. |
| 5,533,888 A | 7/1996 | Belarde |
| 5,558,823 A | 9/1996 | Gray |

(Continued)

FOREIGN PATENT DOCUMENTS

CN 2124969 U 12/1992

(Continued)

OTHER PUBLICATIONS

International Search Report of Mar. 4, 2003 of International Application PCT/US02/34300.

(Continued)

*Primary Examiner*—Eric Hug
*Assistant Examiner*—Jacob Thomas Minskey
(74) *Attorney, Agent, or Firm*—Derek S. Jessen; Leon Nigohosian, Jr.

(57) ABSTRACT

A method is provided for use of a concrete composition and an associated apparatus. The method provides for mixing of the concrete material, accelerant powder and, optionally, an associated substance to enable the controlled hardening of the concrete material in a monolithic structure. The apparatus can dispose a slip-plane film to facilitate a relatively continuous process.

16 Claims, 4 Drawing Sheets depicts the same apparatus as Figure 1 in a subsequent step of the construction process.

U.S. PATENT DOCUMENTS 5,958,312 A    9/1999   Stripp et al.
6,926,851 B2 * 8/2005   Colavito et al. .............. 264/33

FOREIGN PATENT DOCUMENTS

| CN | 2139991 Y | 8/1993 |
|---|---|---|
| CN | 1132186 | 10/1996 |
| CN | 1041708 C | 1/1999 |
| DE | 2143241 | 3/1973 |
| JP | 10-281655 | 10/1998 |
| JP | 11-240770 | 9/1999 |
| SU | 798262 | 1/1981 |

OTHER PUBLICATIONS

Related U.S. Appl. No. 11/135,173 to Colavito published Dec. 8, 2005 as U.S. Appl. No. 20050226952A1.
Related U.S. Appl. No. 11/135,099 to Colavito published Sep. 29, 2005 as U.S. Appl. No. 2005021823A1.
CCI Concrete Coating Inc., Duraset Material Safety Data Sheet, Aug. 1, 2000. pp. 1-3.
Product Description Duraset 1060, 1065, 1070.
UNIFRAX, Material Safety Data Sheet, Aug. 25, 2004. pp. 1-10.

* cited by examiner

Figure 1 depicts an apparatus embodied by the present invention in an initial step of the construction process of a monolithic ladle lining.

Figure 2 depicts the same apparatus as Figure 1 in a subsequent step of the construction process.

METHOD, COMPOSITION AND APPARATUS FOR CONTROLLED CONCRETE

This is a Continuation-In-Part of application Ser. No. 10/007,851, filed on Oct. 31, 2001, now U.S. Pat. No. 6,926,851.

This invention relates to concrete materials and the use and apparatus for the use of such materials. More particularly, the present invention relates to material that can in one instance be used as common concrete material and in another instance can be used as refractory concrete material.

Concrete materials have a variety of uses, including uses in civil engineering applications and as refractory material, such as in the steel production industry.

SUMMARY OF THE INVENTION

In one aspect of the present invention is a method for forming a concrete structure using a method of mixing a concrete material and an accelerant composition. The method allows for control of the concrete hardening so that a monolithic structure can be made. Further control can be obtained by the association or inclusion of selected optional materials.

In another aspect, an apparatus for mixing a concrete material and an accelerant is provided. The apparatus provides a film as a slip-plane between the concrete material and the apparatus so that a monolithic structure is obtained with controlled surface tolerances.

In yet another aspect, there is provided a moldable composition that includes a concrete material and an accelerant. An optional substance can be added for further control of the hardening process.

DETAILED DESCRIPTION OF THE INVENTION

According to the present invention, a method for installing a concrete composition. An apparatus for installing the concrete composition, and a composition are provided for.

Figure 1:
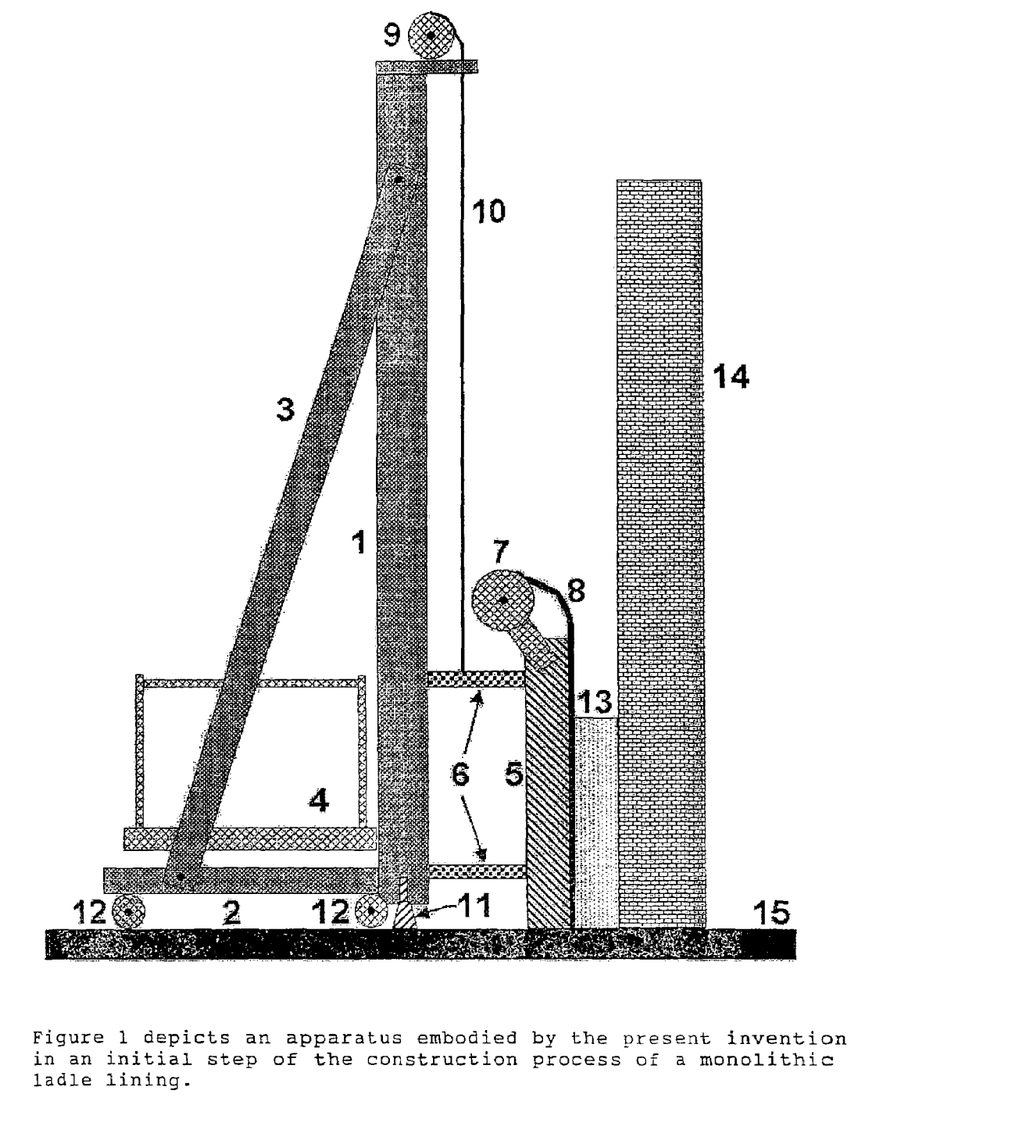
FIG. 1, illustrates an apparatus in an initial step of the construction process of a monolithic ladle lining.
Figure 2:
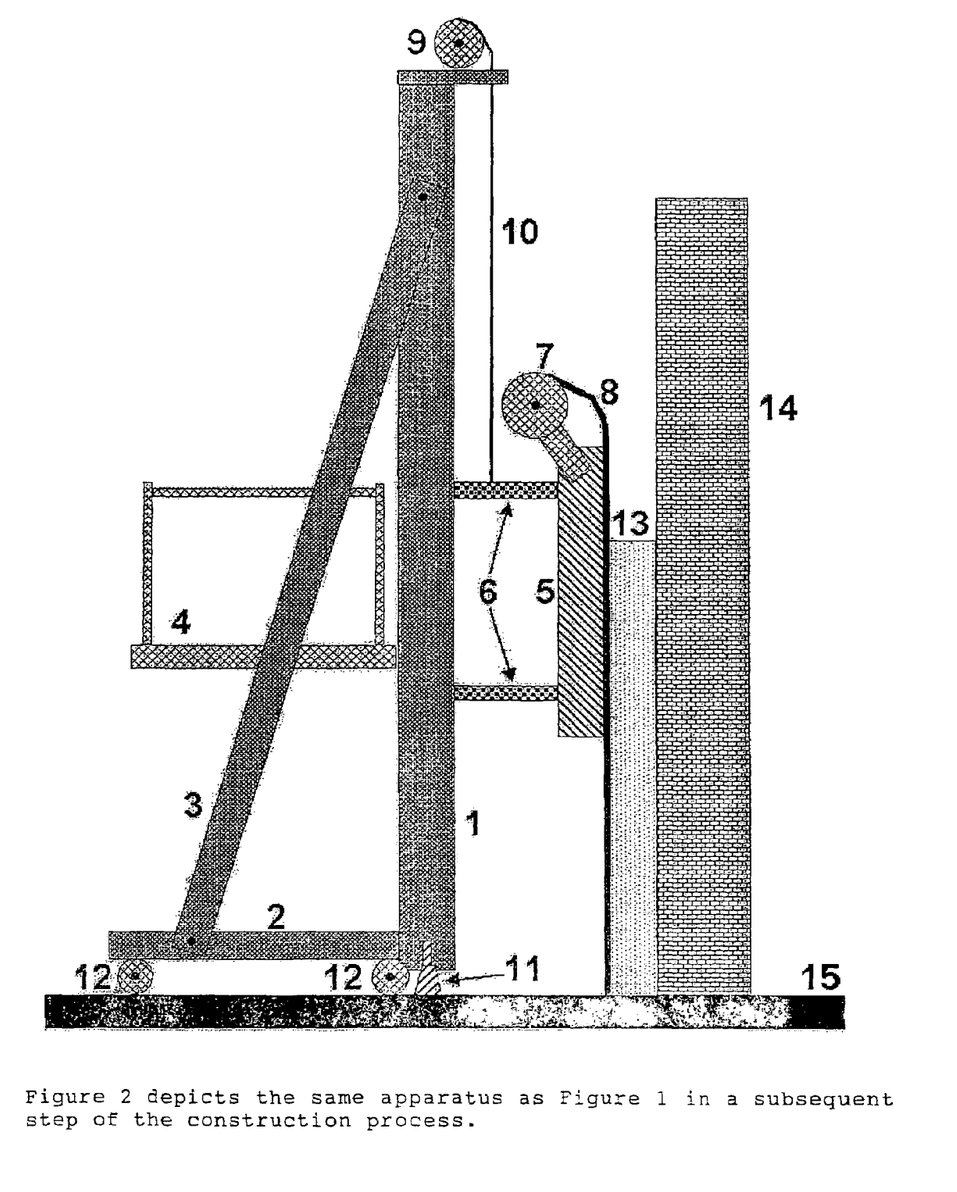
FIG. 2, illustrates the same apparatus in a subsequent step of the construction process.

In FIG. 1 and FIG. 2 there is depicted use of an apparatus consistent with the present invention. In FIG. 1 there is depicted one embodiment of the present invention in which construction of a monolithic lining for a steel ladle is being performed. Depicted is an apparatus containing upright support beam 1, horizontal support base 2, and angle brace 3. These members are rigidly fixed and moved on casters 12 and anchored with positioning jack 11. Moving platform 4, provides a base for an operator of the apparatus to stand. The operator positions adjustable slip-form braces 6, which are perpendicularly attached to slip-form 5. The slip-form 5, can then be moved by unrolling or rolling hoist cable 10 through the power hoist motor 9. The operator controls such movement. Slip-form 5 is positioned at a desired distance from the existing wall 14 and is set on existing floor 15. Concrete 13 is placed into the space between wall 14 and slip-form 5. Film dispensing roll 17 dispenses polymer film 8 into position between concrete 13 and slip-form 5. The interface between slip-form 5 and polymer film 8 provides a slip-plane so that slip-form 5 can be repositioned once concrete 13 has become sufficiently stable to maintain structural integrity. FIG. 2 depicts the elevation of slip-form 5 up the wall to enable the placement of additional concrete 13 to monolithically form with the previously placed concrete 13 as depicted in FIG. 1.

The process may include admixing a concrete composition with an accelerant composition to form a castable or projectable admixture. The admixture being cast or projected into a space between a base a base structure and a moveable form having a surface area in an adjacent position relative to the base structure. The admixture is allowed to set, forming a structure with a free structure surface enabling the form to be moved to a different adjacent position.

The process is repeated forming a monolithic structure section having a surface area larger than the surface area of the moveable form. A monolithic structure section is one in which the different structure sections formed between the form and the base structure are connected with a continuous structure. That is, no seams or other line of discontinuity are present so as to result in a difference in performance. For instance, in an application in which the base structure is a refractory vessel, the monolithic structure can be a ladle wall having a free surface which is exposed to molten metal during use of the vessel. The monolithic form of the wall results in there not being a seam or other discontinuity which enables molten metal to reach the vessel's outer metal wall in a manner which threatens a melt-down of the vessel.

The process enables the practitioner to have the option of producing a monolithic structure having a variability of thickness of less than about 10 millimeters and may be less than about 5 millimeters.

The accelerant composition may be in a dry powdered form and may be one of the known accelerants used in concrete applications. Additionally, the present invention affords the option of using known accelerants in a form, which enables the use of such accelerants, which was not heretofore possible for the present applications. For instance, some known accelerants in a liquid form are too fast acting for use in the present applications. However, when used in a solid form, such as, but not limited to, a powder, such material can now be used. Accelerating agents are believed to function by causing thickening or gelling, such as that resulting from flocculation associated with a rise in the pH of a composition. Such accelerating agents cause firming or hard-setting the concrete bond, that is, causing the onset of the bond phase of the system in which rigidity and load-bearing characteristics arise. In the present process the accelerant powder can be mixed with the concrete composition when the concrete composition is being transported from a holding state to being delivered to the site of use, such as in a concrete or refractory form. This can also be done with an intermediate, short-term holding step before delivery to the site of use. One method of delivery is termed a "shotcreteing" method. In this method the concrete composition is delivered under pressure using, for example, air or water pressure, through a nozzle to a surface for deposit. The accelerant is transported into the nozzle for mixing with the concrete composition prior to its projection from the nozzle. Such mixing may, among other ways, be provided by auger action.

Additionally, the process may include processing the accelerator in a batch wherein the accelerator is admixed with lithium carbonate and propylene glycol to form a first mixture. This first mixture is processed (ground or milled) for from about 60 minutes to about 90 minutes (are these ranges OK?). Additional accelerator is added to the mixture and processed for from about 60 minutes to about 90 minutes (are these ranges OK?) producing a second mixture. The second mixture is then heated to from about 110 degrees Fahrenheit to about 180 degrees Fahrenheit and may be heated to from about 140 degrees Fahrenheit to about 156 degrees Fahrenheit. The mixture is held at this temperature for from about 20 minutes to about 30 minutes forming a final mixture prior to being admixed with the concrete composition.

The process may include using sodium silicate as the accelerant in combination with the lithium carbonate and propylene glycol wherein about 7 percent by weight sodium silicate, about 35 percent by weight lithium carbonate and about 58 percent by weight glycol are used in the initial admixing of the silicate, carbonate and glycol to form a first mixture. An additional 14 percent by weight of the final mixture of sodium silicate is added to the first mixture prior to a second processing step and heating to the desired temperature prior to admixing with the concrete composition.

FIGS. 3A and 3B and FIGS. 4A and 4B show concrete samples that were produced with and without heating the accelerant prior to admixing with the concrete composition.

Figure 3A:
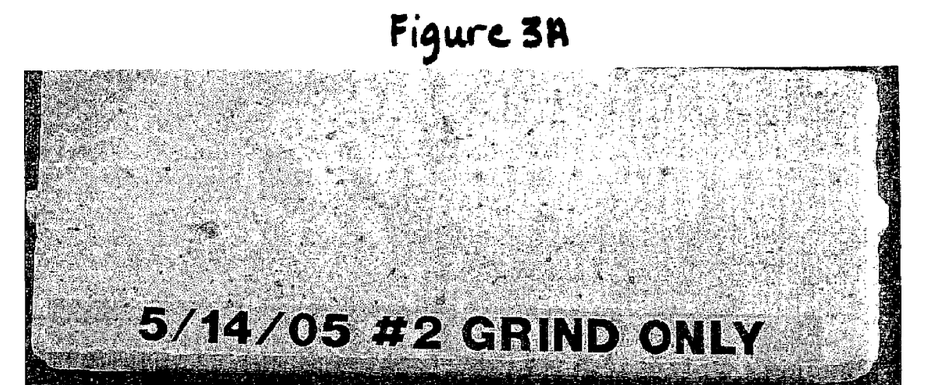
FIG. 3A and FIG. 4A, illustrates concrete samples where the accelerator, lithium carbonate, and propylene glycol of the second mixture is not heated prior to admixing with the concrete composition.
Figure 4A:
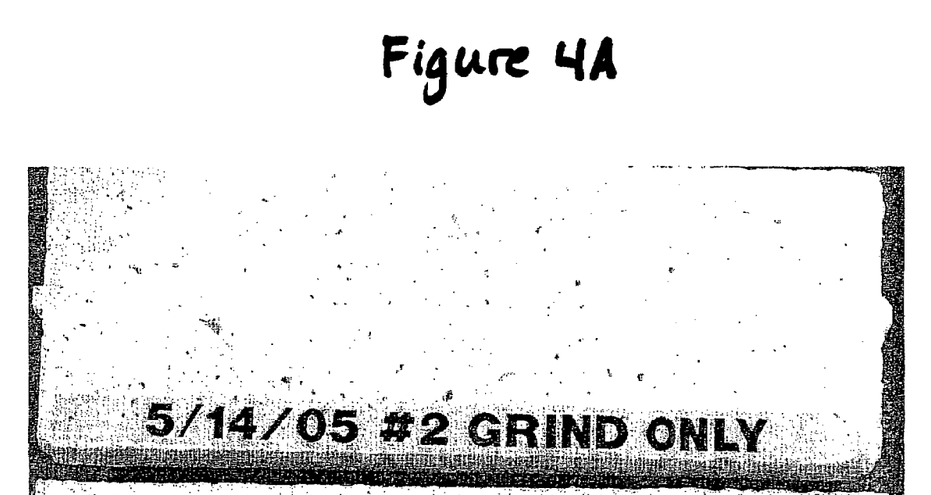

FIG. 3A and FIG. 4A, show concrete samples produced using an accelerant, lithium carbonate and propylene glycol, which were mixed and processed (subjected to grinding) and wherein a second source of sodium silicate was added to the mixture and the mixture subjected to grinding prior to admixing with the concrete composition. No additional heat was added subsequent to adding a second source of silicate and prior to admixing with the concrete composition.

Figure 3B:
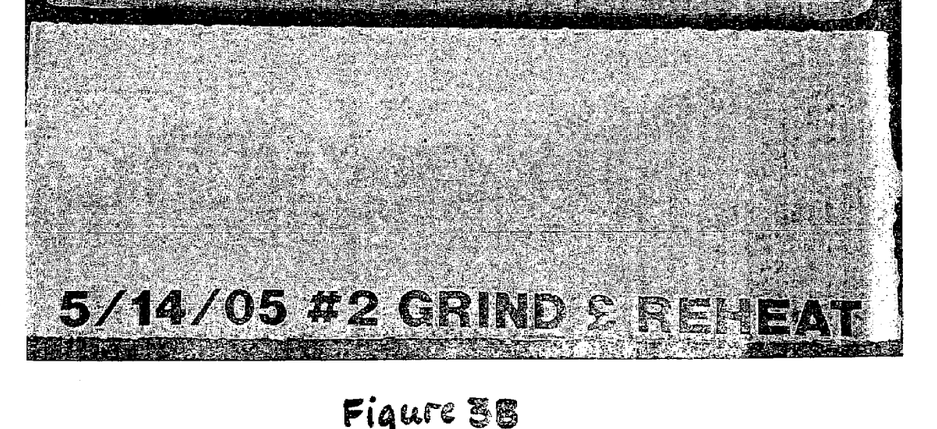
FIG. 3B and FIG. 4B, illustrates another concrete sample where the accelerator, lithium carbonate, and propylene glycol of the second mixture is heated to a temperature of about 140 degrees Fahrenheit prior to admixing with the concrete composition.
Figure 4B:
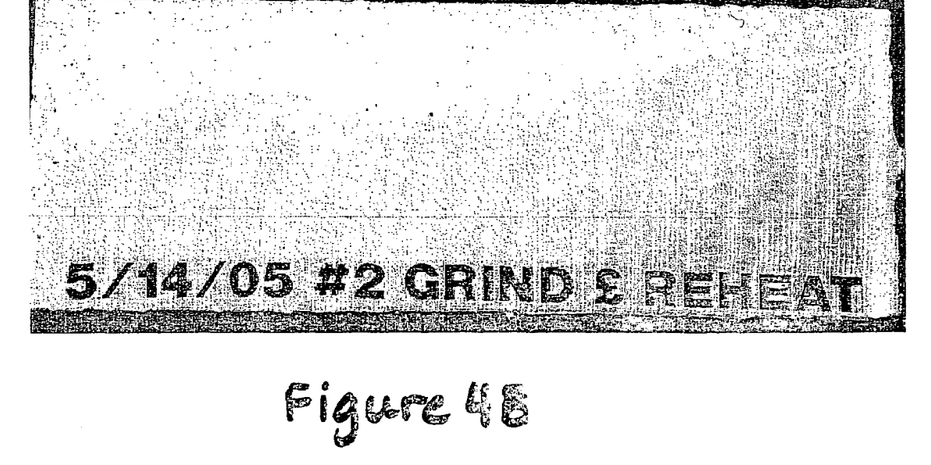

FIG. 3B and FIG. 4B, show concrete samples produced wherein an accelerant, lithium carbonate and propylene glycol were mixed and ground forming a first mixture. Additional accelerant was mixed with the first mixture and subjected to an additional grinding step forming a second mixture. The second mixture was subjected to heating at a temperature of from about 140 degrees Fahrenheit and about 156 degrees Fahrenheit prior to admixing with the concrete composition The process may also use a second composition wherein the accelerant is effectively in association with a carrier to control dispersion and/or transportation of the accelerant. Such carrier can be a powder, a liquid or a melt. The associated substance can optionally be present as a coating on the accelerant powder. Coatings may include, but are to limited to, fatty acids, or other soluble encapsulation compositions.

The carrier may be a liquid or an organic liquid composition. Non-limiting examples of carrier substances are glycols such as, but not limited to, ethylene glycols, propylene glycols, or other glycols, which are liquid at room temperatures; oils, such as mineral or synthetic oils; or other suitable liquids having viscosities and flash-points suitable for the present uses.

The composition may further include a carrier differing from the coating on the accelerant powder. The carrier can include one or more of a powder, a liquid or a melt. The carrier may be miscible in water.

The term concrete composition contemplates one or many of calcium aluminum or equivalent systems of inorganic materials used in engineering materials which harden to perform useful functions of strength and load-bearing. The concrete composition may contain one or more cement(s) including, but not limited to, calcium aluminate cement, calcium silicate cement, a silicate bonded cement, a chlorine-bonded cement, a colloidal silica binder cement, a colloidal alumina binder cement or any combination thereof. Additionally, the concrete composition may be a refractory composition.

The accelerant composition may be from about 0.05 to about 5 weight percent of the total weight of projectable admixture, and can be from about 0.1 to about 1 weight percent of the total weight of projectable admixture.

The process may also use an accelerant composition which includes both a flocculating agent and a setting agent. Additionally, the process can include adjusting a proportion of the flocculating agent and the setting agent to effectively control the action of the accelerant powder to enable the projectable composition to temporarily flow. This adjustment can be from job to job or during the course of a particular job as the conditions warrant.

The process can also be used to construct a non-horizontal structure. For example, one use can be to construct a vessel wall lining in a refractory vessel. In such an application a form is provided adjacent to a vertical wall. Such form is parallel to the internal surface of the vessel and serves to hold a concrete composition in place until such composition sufficiently sets or firms to be able to stand in place after removal of the form. Additionally, the process could include supplying a slip-plane between the concrete composition and the moveable form to enable the moving of the form to a different adjacent position so that the free wall surface maintains integrity. The form can be moved up the wall, after starting the process at a lower or bottom position of the vessel. In this use the process forms a wall section from bottom to top of the vessel in one monolithic form since the form is moved once a sufficient amount of the refractory material in the lower portion of the mold firms and additional refractory material is supplied to fill the then vacant space between wall and form above the material. This material bonds monolithically with the existing material in the mold as the existing material in the upper portion of the mold is still in a moldable state so as to be practically seamless. Optionally, the form could be moved laterally, horizontal to the vessel bottom.

Alternatively, an apparatus which disposes a film or equivalent barrier between the refractory material and the form can be used with this process. This serves to provide a "slip-plane" function which prevents frictional interaction between the form surface and the setting surface of the refractory, thereby avoiding erosion or abrasion of the refractory surface and disrupting the refractory surface. Optionally, the process uses a slip-plane which comprises one or more materials selected from, but not limited to, a plastic, a rubber, a metallic foil, a paper and a screen. The matrix may be a latex or polymer composition, such as, for example, a polyethylene, polypropylene, or polyester film.

In an application where the formed structure is a horizontal monolithic structure with a free top surface, a concrete composition is admixed with an accelerant (which may be in a dry powdered form) to form a castable or projectable material. The accelerant may be in a dry powdered form. The resulting material is cast or projected into a space between a base structure and a moveable form and has a surface area in an adjacent position relative to the base structure. This produces a monolithic structure having a variability of thickness of a desired thickness.

A carrier is selected wherein the accelerant composition can be dispersed and allows for a rate of dissolution of the accelerant to affect the subsequent rate of hardening. That is, one may balance the dispersion characteristics of the liquid and any attenuation or other impact of the liquid on the dissolution rate on the accelerant. For example, upon admixing the concrete composition and the accelerant composition (a mixture of accelerant powder and carrier), the accelerant powder, being initially undissolved, dissolves at a predetermined rate based upon particle size, accelerant powder coating, or carrier liquid. Subsequent to admixing the concrete composition and accelerant, the initial hardening reaction is not occurring or is occurring but at a relatively slower rate than with the presence of a pre-dissolved accelerant. After a period of time, the rate accelerates as the accelerant dissolves and the concrete material commences to interact with the accelerant. The reaction continues to create a flocculation or setting.

The moldable composition can be a pumpable composition wherein a concrete composition is projected to a nozzle, using for example, air or water as the projecting force, wherein an accelerant composition (containing an accelerant powder and optional substance(s)) are mixed prior to projection through the nozzle to the surface upon which the material is to be molded. The optional substance may be an organic liquid. The delayed reaction caused by the accelerant powder's dissolution permits the initial forming as by, for example, blades or vibrators, prior to any significant commencement of the hardening reaction under acceleration due to the presence of the accelerant. The timing permits the continuous formation of a monolithic form by fast incremental movement or by continuous movement of the application apparatus.

The method also allows the pumpable material to flow into a slip-form cavity and take the shape of the cavity prior to achieving a set. The delayed reaction between the concrete material and the accelerant subsequently achieves a fast set which allows rapid movement of the slip-form. The set material that is exposed as the slip-form is moved retains both a smooth surface and the substantially-exact dimensions of the slip-form. The set material can support weight immediately thus eliminating the need for a custom, application specific form, to achieve both smoothness and thickness control. This process requires a relatively small amount of material to be fluid at any one time, thereby enabling use of a lighter and simpler forming structure. This in turn requires less curing time the seen with conventional casting, which typically requires an extended cure time in the mold (excluding quick set materials), often as much as 24-48 hours to achieve an acceptable set before form removal.

The addition of the accelerant powder and carrier at the projection nozzle allows for the concrete composition to be held as a wet mix in hoppers or mixers for extended periods of time without fear of premature setting. The material sets after it has been admixed with the accelerator soon after it enters the slip-form. This allows for far greater field flexibility on installation.

The accelerant powder can be one or more compound(s) selected from the known accelerant powders of the concrete or refractory industries, as well as accelerants not heretofore used in such applications. The accelerant powder can be alkali compounds including, but not limited to, sodium, lithium and potassium compounds. Non-limiting examples include sodium silicate, sodium aluminate, lithium carbonate, lithium citrate, potassium silicate, potassium aluminate, potassium carbonate, sodium carbonate, and lithium hydroxide. Other known accelerants are also usable. Such accelerants can be organic compounds such as, but not limited to, triethanolamine or sulfate compounds. The physical properties of the accelerant powder can also be a consideration in the selection and use of the powder. Accordingly, the accelerant powder is characterized by having a particle size distribution which is effective to control the rate of dissolution and subsequent reaction. Complete dissolution is not necessary for effective reactions in all cases. The particle size should be small enough to suspend the powder in the carrier media, but large enough to control dissolution for the desired reaction rate.

The organic liquid can be any which is compatible with the other materials and the intended use. The relative proportions of concrete material, accelerant powder and organic liquid are proportioned such that the moldable composition is moldable from about fifteen seconds to about 5 minutes. Such proportion enables the placement of the concrete material in a variety of field uses.

In a refractory composition, the accelerant composition can be from about 30 weight percent to about 60 weight percent of accelerant powder and from about 40 weight percent to about 70 weight percent propylene glycol.

An apparatus is also provided for wherein there is a first application means for applying a moldable concrete composition to a base surface to produce a monolithic mass adhering to the base surface. A forming means for slip-forming an outer surface of the monolithic mass at a distance from the base surface; (c) a second application means for applying a protective barrier between the monolithic mass and the forming means effective to maintain the integrity of the outer surface; (d) a structural means for positioning the first application means relative to the base surface effectively to produce the monolithic mass; and, (e) a control means for controlling the forming of the monolithic mass by effectively controlling positioning of the structural means so that the monolithic mass maintains integrity and adheres to the base surface. The control means is used to maintain the dimensional tolerance desired. This embodiment can be used with known concrete compositions or the compositions of the present invention. Alternatively, the apparatus includes a mixing means for admixing a concrete composition and an accelerant composition to produce the moldable concrete composition. Embodiments can further comprise a means for admixing pressurized air to provide the moldable concrete composition with sufficient energy to be projected through ambient air to the surface.

One type of mixing apparatus that can be used is a shotcreteing apparatus. Alternatively, a screw auger can be used to mix the materials and delivery of the material may be by transportation without projection.

The following examples are intended to exemplify the invention and, in no aspect whatsoever, limit it.

EXAMPLE 1

Castable Formulation
Samples of a castable formulation are produced using the following materials and amounts.

| Material | Sizing | Wt. percent |
|---|---|---|
| White Fused Alumina | 0–5000 Microns | 60 |
| Alumina Magnesia Spinel | 0–700 Microns | 20 |
| Alumina Cement | | 5 |
| Calcined Alumina | | 15 |
| Dispersant | | As needed |

This formulation is mixed with water to achieve a static flow of 65 percent.

One sample (Sample A) of the castable formulation is mixed with 0.3 weight percent based on weight of the castable formulation of sodium silicate solution (44 percent solids by weight). This causes floccing to zero flow state within 15 seconds. This sample becomes too thick to flow into a mold.

Another sample (Sample B) of the castable formulation is mixed with 0.3 percent of an accelerator formulation containing 42 percent sodium silicate powder, 7 percent hydrated alumina powder, and 51 percent propylene glycol liquid. All percentages of the accelerator formulation are percents by weight. Sample B produces the following results:

| Initial Flow | Good Flow |
|---|---|
| Initial Floccing | 0:48 (minutes/seconds) |
| Initial Firming | 1:10 (minutes/seconds) |
| Final Set | 4:05 (minutes/seconds) |

"Good flow" means that the material still flows (as prior to accelerator addition).

"Final set" means that the material is not deformable to firm finger pressure.

EXAMPLE 2

A second Sample A is formulated as in Example 1. A different Sample B is formulated using an addition of 0.45 percent (by weight) of an accelerator containing 20 percent sodium silicate powder, 30 percent lithium carbonate powder, and 50 percent propylene glycol liquid. All percentages of the accelerator formulation are percents by weight. Sample B produces the following results:

| Initial Flow | Good Flow |
|---|---|
| Initial Floccing | 0:44 (minutes/seconds) |
| Initial Firming | 4:00 (minutes/seconds) |
| Final Set | 8:15 (minutes/seconds) |

A benefit of maintaining good flowability of Sample B of Examples 1 and 2 is that the materials can be readily molded following the addition of the accelerator to enable a uniform monolithic structure to be constructed.

EXAMPLE 3

The accelerator was processed in the following manner:

Batching:
i) Fifteen pounds (33 kilograms) of GD sodium silicate was weighed and sealed in a plastic bag;
ii) an additional thirty five pounds (77 kilograms) of GD sodium silicate was weighed and sealed in a second plastic bag;
iii) seventy five pounds (165 kilograms) of lithium carbonate was weighed and sealed in a third plastic bag;
iv) one hundred twenty five pounds (275 kilograms) of propylene glycol was weighed and placed in a water cooled tank.

Mixing:
i) The lithium carbonate from the third plastic bag and the GD sodium silicate from the first plastic bag were admixed in the cooling tank containing the propylene glycol forming a first mixture;
ii) The first mixture of carbonate/silicate/glycol were ground in a "TM 8" model Netzsch dispenser, using 2 millimeter yttria stabilized zirconium oxide beads, for about 75 minutes while maintaining the batch temperature at from about 85 degrees Fahrenheit to about 110 degrees Fahrenheit;
iii) The sodium silicate in the second bag was admixed with the first mixture to produce a second mixture and subjected to additional grinding for about 20 minutes to produce a final mixture.

Reheating:
i) The final mixture was placed in a 55 gallon drum with an air mixer to agitate the mixture;
ii) A band heater was placed around the 55 gallon drum and the drum heated to from about 140 degrees Fahrenheit to about 156 degrees Fahrenheit for from about 20 minutes to about 30 minutes.

We claim:

1. A process for installing a concrete composition, the process comprising:
    admixing (a) a first composition comprising a concrete composition, and (b) a second composition comprising dispersed accelerant powder at a concentration of from about 0.05 percent to about 5.0 percent by weight total composition to form a projectable admixture wherein the accelerant powder is lithium carbonate and the second composition is formed by admixing an accelerator with the lithium carbonate and propylene glycol to form a first mixture wherein the first mixture is processed for a specified amount of time and wherein a second amount of accelerator is added to the first mixture forming a second mixture that is processed for an additional amount of time, at which time, the second mixture is heated and maintained at a desired temperature prior to admixing with the concrete composition;
    projecting the admixture into a space between a base wall and a slip-plane wherein the slip-plane is between and adjacent to the projectable admixture and a moveable form having a surface area in an adjacent position relative to the base wall;
    enabling the admixture to set to form a wall with a free wall surface; and,
    moving the form to a different adjacent position wherein the slip-plane can be immediately moved from the free wall surface or left in place for later removal; and, whereby the above process is repeated to form a monolithic wall section having a surface area larger than the surface area of the form.

2. The process of claim 1 wherein the second composition comprises the accelerant effective in association with one or more of a carrier substance(s) selected from the group consisting of a powder, a liquid and a melt such that the one or more of the components controls the action of the accelerant composition to enable the projectable admixture to temporarily flow.

3. The process of claim 2 wherein the carrier substance(s) is an organic liquid composition.

4. The process of claim 1 wherein the process is performed to provide a variability of thickness less than about ten millimeters.

5. The process of claim 2 wherein the carrier is miscible in water.

6. The process of claim 1 wherein the concrete composition comprises one or more cement(s) selected from the group consisting of a calcium aluminate cement, a silicate bonded cement, a chlorine-bonded cement, a colloidal silica binder cement, a calcium silicate cement, and a colloidal alumina binder cement.

7. The process of claim 6 wherein the accelerant powder is from about 0.1 to about 1 weight percent of the total weight of projectable admixture.

8. The process of claim 1 wherein the concrete composition is a refractory composition.

9. The process of claim 1 wherein the accelerant powder comprises a flocculating agent and a setting agent.

10. The process of claim 9 further comprising adjusting the proportion of the flocculating agent and the setting agent to effectively control the action of the accelerant powder to enable the projectable admixture to temporarily flow.

11. The process of claim 1, wherein the slip-plane comprises one or more material selected from the group consisting of a plastic, a rubber, a metallic foil, a paper and a screen.

12. The process of claim 11 wherein the material is a latex or polymer composition.

13. The process of claim 1, wherein the accelerator is a sodium silicate.

14. The process of claim 1, wherein the accelerator is a hydrous sodium silicate.

15. The process of claim 1, wherein the first mixture is processed for from about 60 minutes to about 90 minutes and the temperature is maintained at from about 85 degrees Fahrenheit to about 110 degrees Fahrenheit and wherein the second mixture is processed for from about 15 minutes to about 25 minutes prior to raising the temperature to from about 110 degrees Fahrenheit to about 180 degrees Fahrenheit where the temperature is maintained for about 20 minutes to about 30 minutes prior to admixing with the concrete composition.

16. The process of claim 1, wherein the first mixture is processed for about 75 minutes and the temperature is maintained at from about 85 degrees Fahrenheit to about 110 degrees Fahrenheit and wherein the second mixture is processed for about 20 minutes prior to raising the temperature to from about 140 degrees Fahrenheit to about 156 degrees Fahrenheit where the temperature is maintained for about from 20 minutes to about 30 minutes prior to admixing with the concrete composition.

* * * * *